(12) United States Patent
Chen et al.

(10) Patent No.: US 9,415,534 B2
(45) Date of Patent: Aug. 16, 2016

(54) WATERPROOF ELECTRICAL CONNECTOR

(71) Applicant: FOXCONN INTERCONNECT TECHNOLOGY LIMITED, Grand Cayman (KY)

(72) Inventors: Ding-Cherng Chen, New Taipei (TW); Zhi-Feng Wang, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/583,745

(22) Filed: Dec. 28, 2014

(65) Prior Publication Data

US 2015/0188259 A1 Jul. 2, 2015

(30) Foreign Application Priority Data

Dec. 30, 2013 (CN) .......................... 2013 1 0741109

(51) Int. Cl.
*H01R 13/405* (2006.01)
*B29C 45/14* (2006.01)
*H01R 13/52* (2006.01)
*B29L 31/36* (2006.01)
*H01R 24/62* (2011.01)

(52) U.S. Cl.
CPC ........ *B29C 45/14639* (2013.01); *H01R 13/405* (2013.01); *H01R 13/52* (2013.01); *B29L 2031/36* (2013.01); *H01R 24/62* (2013.01)

(58) Field of Classification Search
USPC .......... 439/108, 101, 607.51, 607.01, 607.55, 439/660
See application file for complete search history.

(56) References Cited

U.S. PATENT DOCUMENTS

| | | | | |
|---|---|---|---|---|
| D301,870 S | * | 6/1989 | Shibano | D13/147 |
| 5,580,268 A | * | 12/1996 | Miyazawa | 439/352 |
| 5,820,412 A | * | 10/1998 | Koegel et al. | 439/607.51 |
| 6,007,381 A | * | 12/1999 | Ando et al. | 439/607.01 |
| 6,224,420 B1 | * | 5/2001 | Nishio et al. | 439/566 |
| D518,445 S | * | 4/2006 | Fan | D13/147 |
| 7,118,411 B2 | * | 10/2006 | Huang et al. | 439/502 |
| 7,503,777 B2 | * | 3/2009 | Ko et al. | 439/108 |
| D599,295 S | * | 9/2009 | Mao et al. | D13/147 |
| 7,618,268 B2 | * | 11/2009 | Ko et al. | 439/101 |
| 7,997,937 B2 | * | 8/2011 | Kondo | 439/660 |
| 8,016,620 B1 | * | 9/2011 | Chiu et al. | 439/660 |
| 8,021,188 B1 | * | 9/2011 | Ma et al. | 439/607.55 |
| 8,066,532 B2 | * | 11/2011 | Hou et al. | 439/660 |
| 8,221,163 B2 | * | 7/2012 | Kawakami et al. | 439/607.13 |

(Continued)

FOREIGN PATENT DOCUMENTS

CN 202737218 2/2013
JP 4875130 12/2011

(Continued)

*Primary Examiner* — Alexander Gilman
(74) *Attorney, Agent, or Firm* — Wei Te Chung; Ming Chieh Chang

(57) ABSTRACT

An electrical connector (100) includes an insulative housing (1) having a frame portion (11) and a tongue portion (12) extending forwardly from the frame portion (11), a number of terminals (2) retained in the tongue portion (12), and a metal shell (3). The frame portion (11) includes a top wall (111), a pair of side walls (112), a rear wall (113) and a bottom wall (114). The metal shell (3) includes a top board (31), a pair of side boards (32), a bottom board (34) and a window (30) defined in a rear end. The insulative housing is insert-molded with the metal shell and the terminals so that the rear wall seals up the window.

20 Claims, 4 Drawing Sheets

(56) References Cited

U.S. PATENT DOCUMENTS

| | | | |
|---|---|---|---|
| 8,348,704 B2 * | 1/2013 | Sloey et al. | 439/690 |
| 8,419,480 B2 * | 4/2013 | Yu et al. | 439/660 |
| 8,696,384 B2 * | 4/2014 | Yokoyama et al. | 439/607.4 |
| 8,840,407 B2 * | 9/2014 | Nose et al. | 439/74 |
| 8,920,197 B2 * | 12/2014 | Tziviskos et al. | 439/660 |
| 9,077,128 B2 * | 7/2015 | Choi et al. | |
| 9,088,095 B2 * | 7/2015 | Yokoyama et al. | |
| 9,136,636 B2 * | 9/2015 | Zhang et al. | |
| 2009/0061655 A1 * | 3/2009 | Miyazaki et al. | 439/74 |

FOREIGN PATENT DOCUMENTS

| | | |
|---|---|---|
| TW | M379889 | 5/2010 |
| TW | M411033 | 9/2011 |
| TW | M439928 | 11/2012 |
| TW | M453271 | 5/2013 |
| TW | M463921 | 10/2013 |
| TW | M464878 | 11/2013 |

* cited by examiner

WATERPROOF ELECTRICAL CONNECTOR

BACKGROUND OF THE INVENTION

1. Field of the Invention

The present invention relates generally to an electrical connector, and more particularly to an electrical connector preventing water or vapor from entering into interior of the connector.

2. Description of Related Arts

An electrical connector is widely applied to various electronic devices as an I/O (Input/Output) port to connect with external signal or power-transmitting cables. On many occasions, a waterproof appliance is necessary and therefore an associated electrical connector also needs to be waterproof. Taiwan Patent No. M379889 discloses an electrical connector comprising an inner shell, an insulative housing, a plurality of contacts retained in the insulative housing, and an outer shell. The contacts are insert-molded in the insulative housing. The insulative housing has a receiving room to receive the inner shell so that the insulative housing covers any holes in the inner shell. Liquid or vapor may still enter into the electrical connector. Japan Patent No. 4875130 discloses an electrical connector comprising a metal shield defining a receiving space, a plurality of contacts received in the receiving space of the metal shield, and an insulative body molded over the metal shield and retaining the contacts. The metal shield together with the contacts is insert molded in one-shot via the insulative body. The insulative body has an insulative cover adhering to an outside surface of the metal shield and a tongue portion extending forwardly into the receiving space for supporting the contacts. The insulative body also has a number of locking holes to receiving a number of resisting portion of a mating connector and the locking holes are covered by a waterproof belt. However, it is not convenient and economic for manufacture.

An electrical connector preventing water or vapor into interior is desired.

SUMMARY OF THE INVENTION

Accordingly, an object of the present invention is to provide an electrical connector having a metal plate capable of avoiding a leakage.

To achieve the above object, an electrical connector comprises: an insulative housing having a frame portion formed with a top wall, a pair of side walls extending downwardly from two sides of the top wall, a rear wall extending downwardly from a rear end of the top wall and a bottom wall, and a tongue portion extending forwardly from the rear wall of the frame portion; a plurality of terminals retained in the tongue portion and inserted outwardly through the rear wall of the insulative housing; and a metal shell having a top board, a pair of side boards extending downwardly from the top board, a bottom board connected with the two side boards, and a window defined in a rear end thereof, wherein the insulative housing is insert-molded with the metal shell and the terminals so that the top wall is pasted to the top board, the side walls are pasted to the respective side boards and the bottom wall is pasted to the bottom board, wherein the rear wall seals up the window.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1 to 4, an electrical connector 100 of the present invention, affixed to a printed circuit board (not shown), comprises an insulative housing 1, a plurality of terminals 2 retained in insulative housing 1 and a metal shell 4 insert-molded with the insulative housing 1. The electrical connector 100 defines a front-to-back direction and a transverse direction perpendicular to the front-to-back direction in a horizontal plane referring to FIG. 1.

Figure 1:
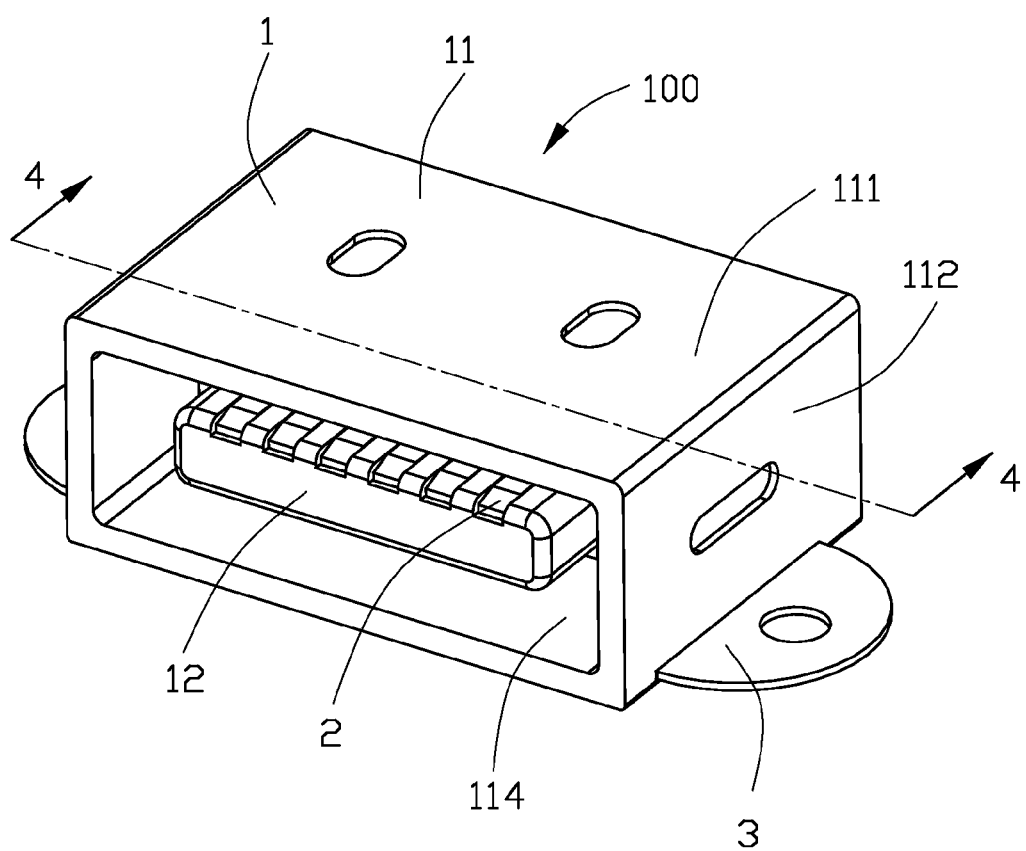
FIG. 1 is a perspective, assembled view of an electrical connector.
Figure 2:
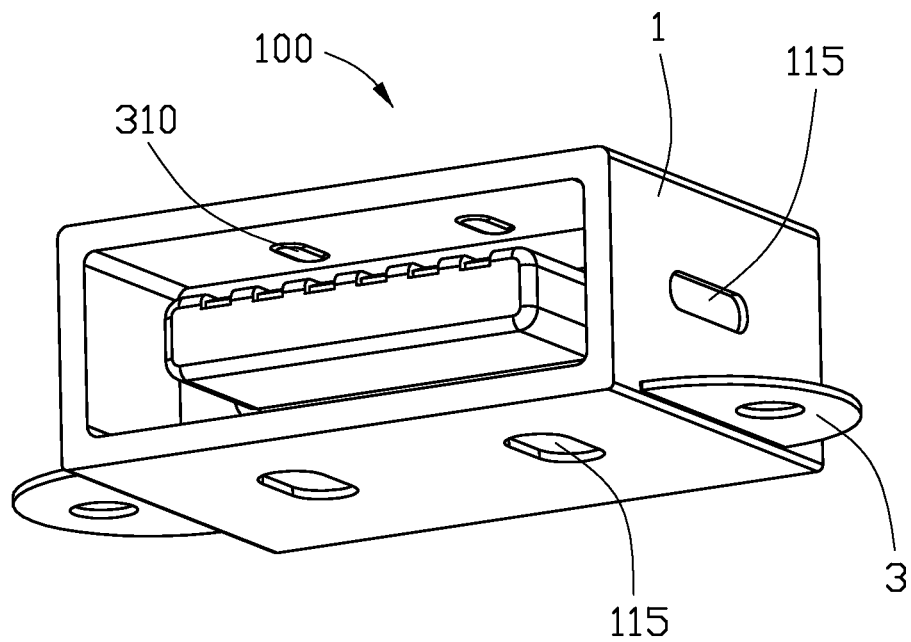
FIG. 2 is a perspective, assembled view of the electrical connector, taken from a different view with respect to FIG. 1.
Figure 3:
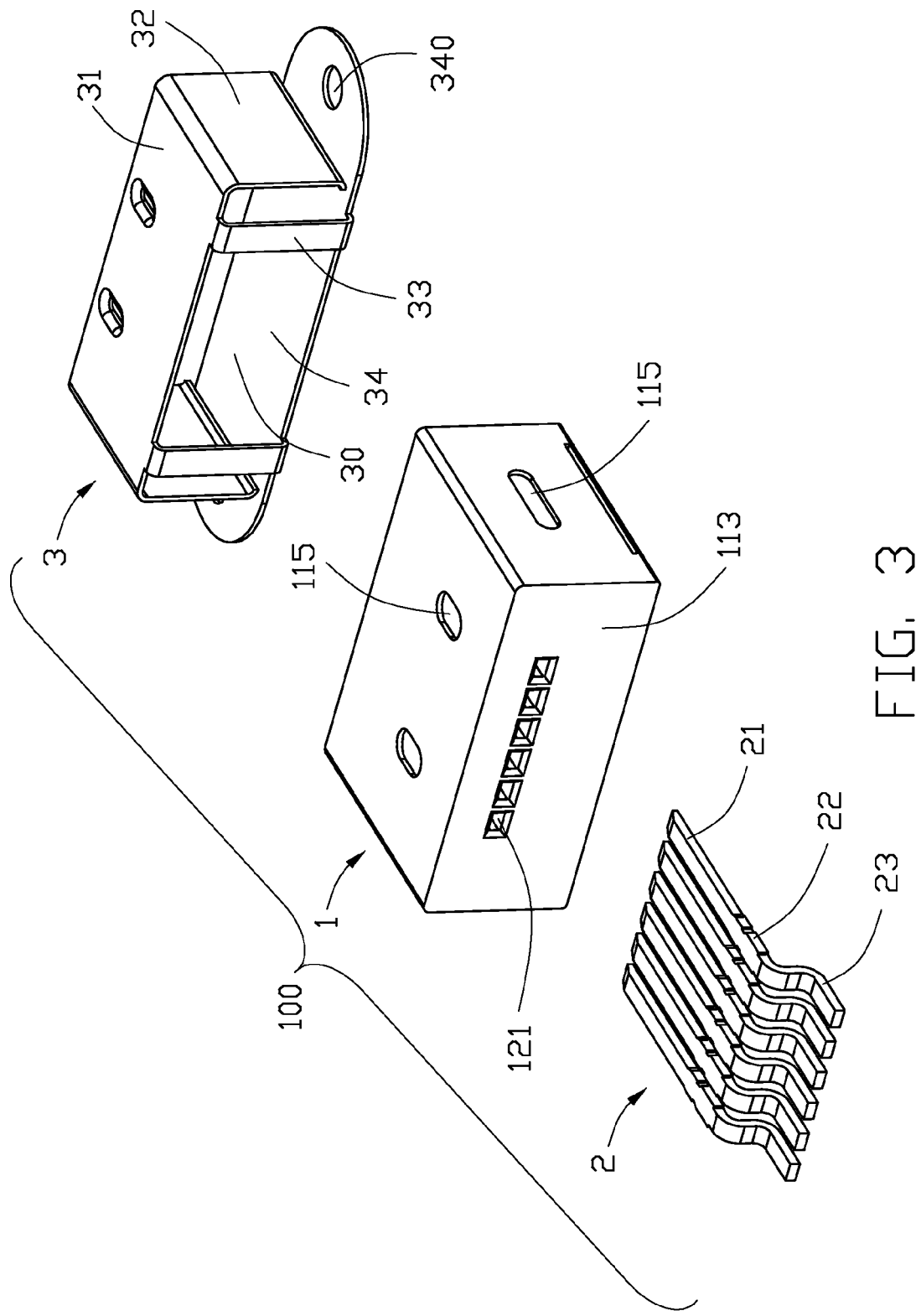
FIG. 3 is a perspective, exploded view of the electrical connector.
Figure 4:
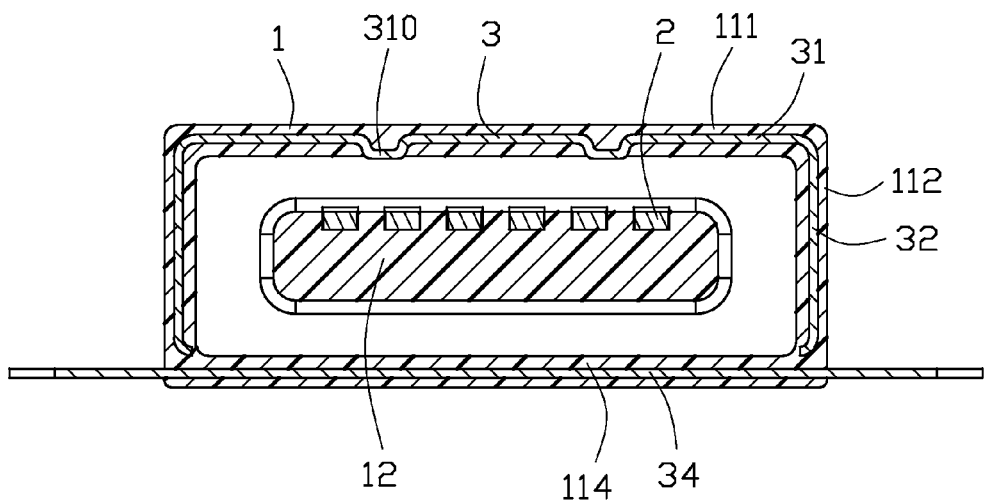
FIG. 4 is a sectional view of the electrical connector with respect to FIG. 1.

Referring to FIGS. 1 to 3, the insulative housing 1 comprises a frame portion 11 and a tongue portion 12 located in the frame portion 11. The frame portion 11 is formed with a top wall 111, a pair of side walls 112 extending downwardly from the two sides of the top wall 111, a rear wall 113 extending downwardly from a rear end of the top wall 111, and a bottom wall 114. The insulative housing 1 has a number of receiving portions 115 in the top wall 111, side walls 112 and the bottom wall 114. The tongue portion 12 extends forwardly from the rear wall 113 and is formed with a number of recesses 121 extending along a front-to-back direction in an upper surface of the tongue portion 12 and through the rear wall 113 of the insulative housing 1. During the insert-molding process of the insulative housing 1 and the metal shell 3, a number of the molds are resisted against the metal shell 3 through the receiving portions 115.

Referring to FIG. 3, the terminals 2 are received in the recesses 121, and each terminal 2 includes a contacting portion 21, a soldering portion 23 and a curved portion 22 bent and extending downwardly from the contacting portion 21 and connected with the soldering portion 23.

The metal shell 3 is formed with a top board 31, a pair of side boards 32 bent and extending downwardly from the top board 31, a bottom board 34 aerial to the side boards 32 and a pair of supporting arms 33 (or a rear board with a window) extending downwardly from the top board 31 to the bottom board 34. The metal shell 3 has a window 30 in a rear end and a pair of fins 340 extending laterally from two sides of bottom board 34 and extending through the side walls 112 of the frame portion 11. Referring to FIG. 2, the top board 31 has a number of protruding portions 310 extending to the frame portion 11. The protruding portions 310 pass through the holes 116 in the insulative housing 1 and resist against a mating connector.

The metal shell 3 is insert-molded with the insulative housing 1. The top wall 111 packages the top board 31, the side walls 112 package the respective side boards 32 and the bottom wall 114 packages the bottom board 34. The metal shell 3 is shrouded by the insulative housing 1. The insulative housing 1 connects the side boards 32 with the bottom board 114. In a favorable embodiment as shown in FIG. 3, the metal shell 3 is embedded in the insulative housing 1 for improved sealing purpose. The top board 31 is sandwiched between outer layer and inner layer of the top wall 111. Each side board 32 is sandwiched between outer layer and inner layer of the side wall 112. The bottom board 34 is sandwiched between outer layer and inner layer of the bottom wall 114.

The rear wall 113 seals up the window 30 so as to avoid any gap between the insulative housing 1 and the metal shell 3. As a result, the liquid or vapor in the air is kept from the electrical connector 100 to avoid a short with an easier and more convenient fabrication.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical connector comprising:
    an insulative housing having a frame portion formed with a top wall, a pair of side walls extending downwardly from two sides of the top wall, a rear wall extending downwardly from a rear end of the top wall, and a tongue portion extending forwardly from the rear wall of the frame portion;
    a plurality of terminals retained in the tongue portion and extending outwardly through the rear wall of the insulative housing; and
    a metal shell having a top board, a pair of side boards extending downwardly from the top board, a bottom board, and a window defined in a rear end thereof,
    wherein the insulative housing is insert-molded with both the metal shell and the terminals so that the top wall packages the top board, the side walls package the respective side boards, the rear wall sealing the window; wherein
    most portions of said metal shell is embedded and hidden within the frame portion.

2. The electrical connector as claimed in claim 1, wherein said insulative housing comprises a bottom wall opposite to the top wall, and the bottom board packages the bottom wall.

3. The electrical connector as claimed in claim 2, wherein said top board is embedded in the top wall, each side board is embedded in corresponding side wall, and said bottom board is embedded in the bottom wall.

4. The electrical connector as claimed in claim 2, wherein said bottom board is separated from the side boards by a gap, and said insulative housing fill up the gap between the side boards and the bottom board.

5. The electrical connector as claimed in claim 4, wherein said metal shell comprises a pair of supporting arms extending downwardly from the top board to the bottom board to define therebetween said window through which said terminals rearwardly extend.

6. The electrical connector as claimed in claim 2, wherein said insulative housing has a plurality of receiving portions defined in the top wall, side walls, and the bottom wall for accommodating molds resisting against the metal shell.

7. The electrical connector as claimed in claim 1, wherein said shell forms at least one protruding portion inwardly extending through an interior surface of the frame portion and inwardly exposed toward the tongue portion.

8. An electrical connector comprising:
    a metallic shield including opposite top and bottom boards and two opposite side boards to form a rectangular configuration;
    an insulative housing including opposite top and bottom walls and two opposite side walls to commonly form another rectangular configuration similar to said rectangular configuration and have the top board, the bottom board and two opposite side boards integrally embedded within the corresponding top wall, bottom wall and two opposite side walls, respectively, via an insert-molding process;
    a receiving cavity formed in the integrally formed housing and shield for receiving a plug connector;
    a plurality of terminals integrally assembled to and disposed within the housing via a insert-molding process, each of said terminals including a mating section exposed within the receiving cavity, and a tail section exposed outside of the integrally formed housing and shield; wherein
    the shield is protectively embedded within the housing and is not exposed to the receiving cavity except a bulged portion inwardly extending beyond an interior surface of the housing to be exposed to the receiving cavity for mechanically and electrically connecting a metallic shell of the plug connector.

9. The electrical connector as claimed in claim 8, wherein said housing further includes a rear wall with a mating tongue forwardly extending therefrom and into the receiving cavity.

10. The electrical connector as claimed in claim 8, wherein the insert-molding process of having the metallic shield embedded within the housing and the insert-molding process having the terminals embedded within the housing, occur simultaneously.

11. The electrical connector as claimed in claim 8, wherein the bottom board is higher than an undersurface of the bottom wall.

12. The electrical connector as claimed in claim 8, wherein the bottom board is further equipped with two wings extending outside of the two opposite side boards for mounting consideration.

13. The electrical connector as claimed in claim 8, wherein said housing includes a plurality of receiving portions to expose the shield to an exterior outwardly so as to allow a mold to abut against the shield during said insert-molding process of having the metallic shield embedded within the housing.

14. The electrical connector as claimed in claim 8, wherein the housing further includes a rear wall behind the receiving cavity, and said shield further includes a rear board behind the receiving cavity to be embedded within the rear wall, and the rear board forms a window to allow the terminals to extend rearwardly to form the tail sections.

15. The electrical connector as claimed in claim 14, wherein said rear wall defines a plurality of recesses to receive the corresponding terminals, respectively.

16. The electrical connector as claimed in claim 8, wherein said shield further includes a rear board, and the two opposite side walls are not directly unitarily connected to the bottom board but with the top board while the rear board is unitarily connected to both and between the top board and the bottom board.

17. A method of making an electrical connector, comprising steps of:
    providing a metallic shield with a rectangular configuration having opposite top and bottom boards and two opposite side boards;
    forming an insulative housing upon the shield via a first insert-molding process wherein said housing includes opposite top and bottom walls and two opposite side walls to have the corresponding top board, bottom board and two opposite side boards embedded therein, respectively; and providing a plurality of terminals retained within the housing via a second insert-molding process, each of said terminals including a mating section and tail section; wherein said housing defines a rectangular receiving cavity in compliance with said rectangular configuration, and the mating sections of said terminals are exposed in the receiving cavity while the tail sections of the terminals are exposed outside of the housing; wherein the shield is protectively embedded within the housing and is not exposed to the receiving cavity except a bulged portion inwardly extending beyond an interior surface of the housing to be exposed to the receiving cavity for mechanically and electrically connecting a metallic shell of the plug connector.

18. The method as claimed in claim 17, wherein said housing further unitarily formed with a rear wall with a mating tongue extending forwardly therefrom, and the mating sections of the terminals are exposed upon the mating tongue.

19. The method as claimed in claim 18, wherein said shield further includes a rear board to unitarily connect both the top board and the bottom board, and a window is formed in the rear board to have said terminals rearwardly extend therethrough.

20. The method as claimed in claim 19, wherein the side boards are not directly unitarily linked to the bottom board but through the top board and the rear board indirectly.

* * * * *